(12) United States Patent
Poulin et al.

(10) Patent No.: US 7,953,004 B2
(45) Date of Patent: May 31, 2011

(54) MINIMIZING EFFECTS OF PACKET DELAY VARIATION IN TIME-DIVISION MULTIPLEXING PSEUDOWIRE SERVICES

(75) Inventors: Andre Poulin, Gatineau (CA); Wayne Groff, Kanata (CA)

(73) Assignee: Alcatel Lucent, Paris (FR)

( * ) Notice: Subject to any disclaimer, the term of this patent is extended or adjusted under 35 U.S.C. 154(b) by 49 days.

(21) Appl. No.: 12/349,324

(22) Filed: Jan. 6, 2009

(65) Prior Publication Data

US 2010/0172357 A1 Jul. 8, 2010

(51) Int. Cl.
*H04L 12/26* (2006.01)
(52) U.S. Cl. ............... 370/230; 370/412; 370/516
(58) Field of Classification Search .......... 370/412, 370/232, 503, 229, 506, 474, 395.3, 394, 370/230, 235, 416, 352
See application file for complete search history.

(56) References Cited

U.S. PATENT DOCUMENTS

| | | | |
|---|---|---|---|
| 7,006,511 B2 * | 2/2006 | Lanzafame et al. | 370/412 |
| 7,170,856 B1 * | 1/2007 | Ho et al. | 370/230 |
| 7,349,330 B1 * | 3/2008 | Hayakawa et al. | 370/229 |
| 7,359,324 B1 * | 4/2008 | Ouellette et al. | 370/230 |
| 7,733,893 B2 * | 6/2010 | Lundin | 370/412 |
| 2002/0031126 A1 * | 3/2002 | Crichton et al. | 370/394 |
| 2003/0142696 A1 * | 7/2003 | Holmeide et al. | 370/508 |
| 2004/0190537 A1 * | 9/2004 | Ferguson et al. | 370/412 |
| 2008/0107137 A1 * | 5/2008 | Yasui | 370/516 |

* cited by examiner

*Primary Examiner* — Michael J Moore, Jr.
(74) *Attorney, Agent, or Firm* — Kramer & Amado P.C.

(57) ABSTRACT

Various exemplary embodiments relate to a method and related node for outputting packets from a playout buffer in a node in a packet-switched network including one or more of the following: configuring a Time-Division Multiplexing (TDM) pseudowire terminating at the node; receiving a plurality of fixed-length packets transmitted over the TDM pseudowire; adding the plurality of fixed-length packets to the playout buffer such that the playout buffer reaches a current fill level; inserting at least one dummy packet into the playout buffer, wherein a total length of the at least one dummy packet is equal to a target fill level of the playout buffer minus the current fill level and the target fill level represents a minimum fill level required before output of packets from the playout buffer; and outputting the plurality of fixed-length packets and the at least one dummy packet from the playout buffer.

27 Claims, 4 Drawing Sheets

MINIMIZING EFFECTS OF PACKET DELAY VARIATION IN TIME-DIVISION MULTIPLEXING PSEUDOWIRE SERVICES

TECHNICAL FIELD

Embodiments disclosed herein relate generally to emulation of time-division multiplexing in a packet-switched network and, more particularly, to optimization of playout buffers used to minimize the effects of packet delay variation.

BACKGROUND

In many legacy telecommunications networks, transmissions between two nodes in the network are accomplished using time-division multiplexing (TDM). TDM combines multiple data streams into one signal, thereby allowing the data streams to share the physical lines in the data path without interfering with one another. More specifically, as its name suggests, TDM divides the signal into a number of segments, each constituting a fixed length of time. Because the sending node assigns data to the segments in a rotating, repeating sequence, the receiving node may reliably separate the data streams at the other end of the transmission medium.

With the rapid development of modern packet-switched networks, however, TDM has gradually fallen out of favor as a preferred technology. For example, Voice-Over-Internet Protocol (VoIP) services have replaced many TDM-based services, given VoIP's flexibility, ease of implementation, and reduction in costs. Unfortunately, transitioning to IP-based services requires a service provider to incur significant expenses in expanding its infrastructure and replacing customer premises equipment.

Given the large initial investment, many service providers have been reluctant to make the transition from TDM-based services to corresponding services in packet-switched networks. TDM pseudowires allow service providers to gradually make the transition to packet-switched networks, eliminating the need to replace TDM-based equipment and drop support of legacy services. In particular, on the ingress end of a TDM pseudowire, a node converts the TDM signals into a plurality of packets, then sends the packets across a packet-based path, or pseudowire. Upon receipt of the packets, a node on the egress end converts the packets back into TDM signals and forwards the TDM signals towards their ultimate destination.

Although TDM pseudowires offer flexibility and reduce expenses, they also introduce problems specific to packet-switched networks. Unlike TDM connections, packet-switched networks do not include mechanisms to ensure that nodes in the network send and receive packets at a constant rate. As a result, packet-switched networks inherently introduce a problem known as packet delay variation (PDV). PDV is particularly problematic when using the packet-switched network to emulate a TDM connection, as a multiplexed TDM signal must strictly adhere to timing requirements to ensure proper separation of the streams at the receiving node. PDV can dramatically affect the timing of the signal and, therefore, result in loss of data and affect the user's quality of experience.

The playout buffer is one solution developed to address the problem of packet delay variation when emulating TDM connections. A playout buffer regulates packet delay variation by temporarily storing packets, then outputting the packets at regular intervals using a play-out algorithm. Existing playout buffers, however, fail to meet the exact delay specified by a service provider except when the specified delay is a multiple of the delay associated with each packet. As a result, these systems increase the chances of a buffer underrun or overrun and therefore increase the likelihood of loss of data or interruptions that negatively affect the end user's quality of experience.

For the foregoing reasons and for further reasons that will be apparent to those of skill in the art upon reading and understanding this specification, there is a need for a playout buffer for use in connection with TDM pseudowires that provides the delay specified by the user.

SUMMARY

In light of the present need for a playout buffer that efficiently outputs packets while minimizing delays, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for outputting packets from a playout buffer in a node in a packet-switched network. The method may comprise a step of configuring a Time-Division Multiplexing (TDM) pseudowire terminating at a node in a packet-switched network. In addition, the method may comprise a step of receiving a plurality of fixed-length packets transmitted over the TDM pseudowire and adding the plurality of fixed-length packets to the playout buffer. The method may further comprise a step of inserting at least one dummy packet into the playout buffer. In various exemplary embodiment, a total length of the at least one dummy packet is equal to a target fill level of the playout buffer minus the current fill level, with the target fill level representing a minimum fill level required before output of packets from the playout buffer. In addition, the method may comprise a step of determining, in response to insertion of the at least one dummy packet, that the playout buffer has reached the target fill level and a step of outputting the plurality of fixed-length packets and the at least one dummy packet from the playout buffer.

In various exemplary embodiments, the step of inserting the at least one dummy packet into the playout buffer occurs when the target fill level minus the current fill level is less than the length of a single fixed-length packet transmitted over the TDM pseudowire. Furthermore, the step of inserting the at least one dummy packet into the playout buffer may occur only when the node first receives packets over the TDM pseudowire after negotiation at the pseudowire level. In these embodiments, the at least one dummy packet may contain a pattern of bits equal to a pattern of bits sent to a TDM destination node after the negotiation phase of the TDM pseudowire.

A number of embodiments may be used for adding the dummy packet to the playout buffer. In particular, the dummy packet may be inserted at the end of the playout buffer, at the beginning of the playout buffer, or between two of the plurality of fixed-length packets added to the playout buffer. Furthermore, the at least one dummy packet may be a plurality of dummy packets, wherein the total length of the plurality of dummy packets is equal to the desired delay. In various exemplary embodiments, the dummy packet contains the idle pattern, or all "1"s.

In addition, various exemplary embodiments relate to a node for use in a packet-switched network providing a Time- Division Multiplexing (TDM) pseudowire. The node may comprise a receiver that receives a plurality of fixed-length packets transmitted over the TDM pseudowire. The node may further comprise a playout buffer encoded on a machine-readable storage medium, the playout buffer having a target fill level representing a minimum fill level required before output of packets. In addition, the node may include a circuit emulation engine that receives packet outputted from the playout buffer and transmits a TDM signal based on the outputted packets. Finally, the node may include a processor configured to add the plurality of fixed-length packets to the playout buffer such that the playout buffer reaches a current fill level, to insert at least one dummy packet into the playout buffer, wherein a total length of the at least one dummy packet is equal to the target fill level of the playout buffer minus the current fill level, to determine, in response to insertion of the at least one dummy packet, that the playout buffer has reached the target fill level, and to initiate output of the plurality of the fixed-length packets and the at least one dummy packet from the playout buffer to the circuit emulation engine.

BRIEF DESCRIPTION OF THE DRAWINGS

In order to better understand various exemplary embodiments, reference is made to the accompanying drawings, wherein.

DETAILED DESCRIPTION

Figure 1:
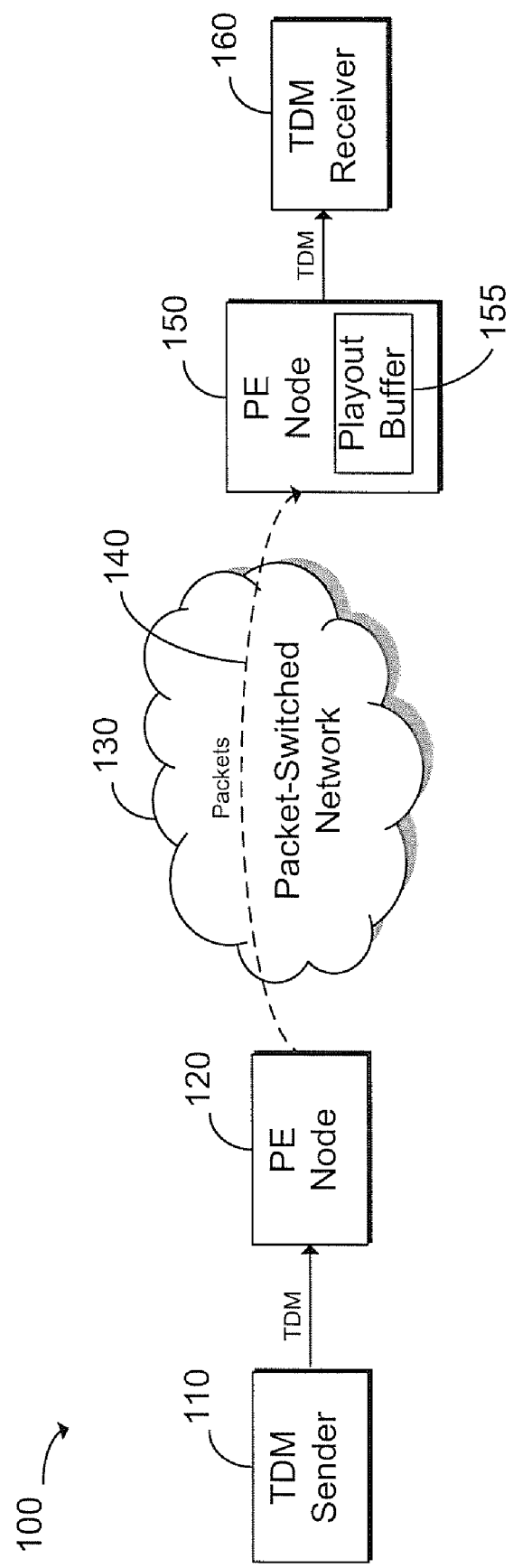
FIG. 1 is schematic diagram of an exemplary system for implementing emulation of TDM over a packet-switched network, the system including a node with a playout buffer.

Referring now to the drawings, in which like numerals refer to like components or steps, there are disclosed broad aspects of various exemplary embodiments.

FIG. 1 is schematic diagram of an exemplary system 100 for implementing emulation of TDM over a packet-switched network. In various exemplary embodiments, system 100 includes a TDM sender 110, a provider edge node 120, a packet switched-network 130, a TDM pseudowire 140, a provider edge node 150 with a playout buffer 155, and a TDM receiver 160.

TDM sender 110 may be any device suitable for generating and sending TDM signals. Thus, TDM sender 110 may be, for example, a wireless base station including a wire line interface to forward TDM data streams into provider edge node 120. For example, TDM sender 110 may be a Node B in a 3G network or another base transceiver station communicating in a Global System for Mobile Communications (GSM) network, a Universal Mobile Telecommunications System (UMTS) network, a Long Term Evolution (LTE) network, or other wireless network. TDM sender 110 may also be a component for implementing a Plesiochronous Digital Hierarchy (PDH), a Synchronous Digital Hierarchy (SDH), Synchronous Optical Networking (SONET), T1/E1 wirelines, or suitable replacements that will be apparent to those of skill in the art.

Provider edge node 120 may be configured to receive a TDM signal from TDM sender 110, convert the signal to a plurality of packets, then transmit the packets at a constant interval or rate over a packet-switched network 130. Thus, provider edge node 120 may be a network element such as a router or switch including functionality to enable communication over a TDM pseudowire 140.

Packet-switched network 130 may be any network operating in accordance with a packet-based protocol. Thus, network 130 may operate, for example, according to Transmission Control Protocol/Internet Protocol (TCP/IP), Multi Protocol Label Switching (MPLS), Ethernet, Provider Backbone Transport (PBT), or any other suitable packet-based protocol that will be apparent to those of skill in the art.

System 100 may also include a TDM pseudowire 140 for transmitting data between provider edge node 120 and provider edge node 150 over packet-switched network 130. More specifically, TDM pseudowire 140 may comprise multiple hops in packet-switched network 130 for transmission of a plurality of packets that emulate a TDM signal. Thus, TDM pseudowire 140 may be implemented according to Request For Comments (RFC) 4553, "Structure-Agnostic Time Division Multiplexing over Packet" (SAToP), published by the Internet Engineering Task Force (IETF). Alternatively, TDM pseudowire 140 may be implemented according to RFC 5086, "Structure-Aware Time Division Multiplexed Circuit Emulation Service over Packet-Switched Network" (CESoPSN), also published by the IETF. Suitable variations for implementation of TDM pseudowire 140 will be apparent to those of skill in the art.

Provider edge node 150 may receive, at a variable rate, packets transmitted from provider edge node 120 over TDM pseudowire 140. Provider edge node 150 may then convert the packets back into a TDM signal for transmission of the signal to TDM receiver 160. Playout buffer 155 may implement a user-specified delay, such that packets are queued in buffer 155 prior to output to the component used to convert the packets back into a TDM signal. Playout buffer 155 will thereby mitigate the effects of packet delay variation introduced by the network, as provider edge node 150 may output packets at a constant rate.

According to the various exemplary embodiments, a dummy packet may be inserted into playout buffer 155 to ensure that buffer 155 provides the user-specified delay. More specifically, when initiating or otherwise configuring a TDM pseudowire, playout buffer 155 may be monitored to determine the optimal time to insert one or more dummy packets. The internal components of provider edge node 150, including playout buffer 155, are described in further detail below with reference to FIG. 2.

System 100 may also include a TDM receiver 160, which receives the outputted TDM signal from provider edge node 150. Thus, TDM receiver 160 could be, for example, customer premise equipment, a node, or any other component configured to receive and/or process TDM signals.

Figure 2:
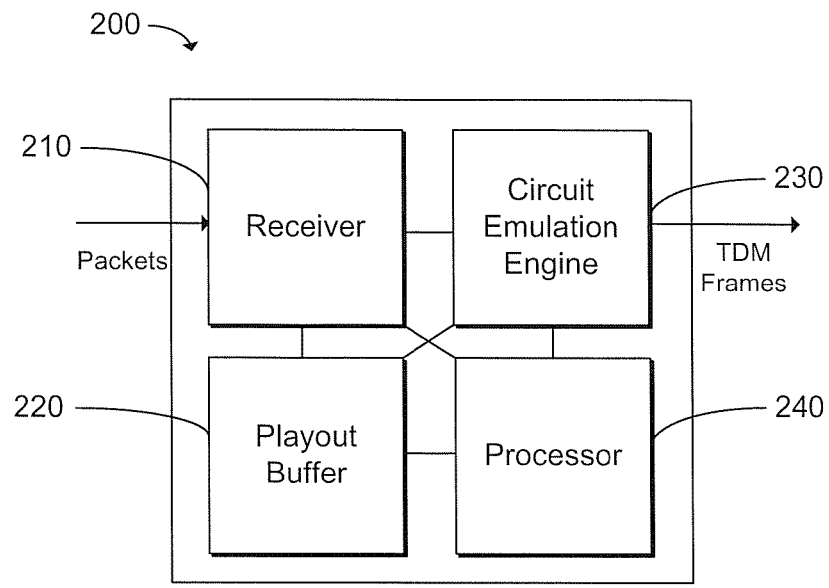
FIG. 2 is a schematic diagram of an exemplary node including a playout buffer for use in the system of FIG. 1.

FIG. 2 is a schematic diagram of an exemplary node 200 including a playout buffer 220 for use in the system 100 of FIG. 1. Node 200 may operate as the last node in a packet-switched network, such that node 200 may receive a plurality of packets and transmit a TDM signal. In various exemplary embodiments, node 200 includes a receiver 210, a playout buffer 220, a circuit emulation engine 230, and a processor 240. Receiver 210 may be an interface comprising hardware and/or software configured to receive packets transmitted over a packet-switched network. More specifically, when serving as a receiver of packets transmitted over a TDM pseudowire, receiver 210 may obtain a plurality of fixed-length packets associated with a given TDM circuit. Because packet-switched networks generally introduce delay in transmission of packets, receiver 210 may experience packet delay variation when obtaining packets over the TDM pseudowire.

Playout buffer 220 may be a component comprising hardware and/or software encoded on a machine-readable storage medium configured to temporarily store packets prior to outputting the packets to circuit emulation engine 230. Thus, playout buffer 220 may comprise random access memory (RAM) or any other memory type, provided that playout buffer 220 may store packets from receiver 210 and output the packets to circuit emulation engine 230. Playout buffer 220 may account for packet delay variation in packets obtained at receiver 210. In particular, by buffering packets prior to outputting the packets to circuit emulation engine 230, playout buffer 220 may ensure that circuit emulation engine 230 properly reconstructs and sends the TDM signal associated with the packets.

Playout buffer 220 may have a number of user-configurable parameters. A user may set the maximum fill level or length of playout buffer 220, which specifies the maximum number of packets that may be stored before an overfill error occurs. A user may also set the target fill level, such that playout buffer 220 will not output packets to circuit emulation engine 230 until the current fill level of playout buffer 220 equals or exceeds the target fill level.

Circuit emulation engine 230 may be a component comprising hardware and/or software encoded on a machine-readable storage medium configured to receive packets from playout buffer 220 and output the data contained in the packets as a TDM signal. More specifically, circuit emulation engine 230 may be configured to receive a plurality of packets from playout buffer 220, extract the data contained in the packets, then forward the data over a TDM connection. The detailed operation and implementation of circuit emulation engine 230 will be apparent to those of ordinary skill in the art.

Processor 240 may be a conventional microprocessor, a Field Programmable Gate Array (FPGA), or any other component configured to execute a series of instructions to control the functionality and interaction of receiver 210, playout buffer 220, and circuit emulation engine 230. In various exemplary embodiments, processor 240 may add packets to playout buffer 220 as they are received at receiver 210, such that the playout buffer 220 reaches a current fill level. Processor 240 may be configured to continue to add packets to playout buffer 220 as they are received.

Processor 240 may be further configured to add a dummy packet to playout buffer 220. Because playout buffer 220 will only output packets when a target fill level is reached, processor 240 may add a dummy packet to allow playout buffer 220 to meet the target fill level and thereby begin output of packets to circuit emulation engine 230. More specifically, after negotiation of the pseudowire or after a buffer underrun error has occurred, processor 240 may monitor the current fill level of playout buffer 220. When the difference between the target fill level and the current fill level is less than the size of a single packet, processor 240 may generate a packet and add the packet to playout buffer 220. This packet, known as a dummy packet, may be set to a length equal to the difference between the target fill level and the current fill level. Furthermore, the packet may contain a pattern of bits set to, for example, the idle pattern, which contains all "1"s. As described further below with reference to FIGS. 4-7, the dummy packet or packets may be added to any of a number of positions within playout buffer 220.

Because the dummy packet may be set to a length equal to the difference between the target fill level and the current fill level, adding the dummy packet to playout buffer 220 will result in playout buffer 220 reaching the target fill level exactly. Upon determining that playout buffer 220 has reached the target fill level, processor 240 may initiate readout of the packets from playout buffer 220 to circuit emulation engine 230, such that circuit emulation engine 230 may begin output of the original TDM signal to the TDM destination node.

In various exemplary embodiments, processor 240 executes the above-described procedure for adding a dummy packet only after negotiation at the TDM pseudowire level or after errors that require renormalization of the pseudowire, such as a buffer underrun. In particular, adding a dummy packet may only be necessary to ensure that subsequent packets received in playout buffer 220 will fall directly on target fill level, such that playout buffer 220 provides the exact delay specified by the user. Furthermore, the pattern of bits used in the dummy packet may be set to the same pattern of bits sent to the TDM destination node after the negotiation phase of the TDM pseudowire. For example, when initiating a pseudowire, a source node may send all "1"s. In this example, by setting the pattern of bits in the dummy packet to all "1"s, the dummy packet would be undetectable as "dummy" data to the destination node.

As an example of the operation of node 200, suppose a user configures playout buffer 220 to have a maximum fill level of 15 milliseconds (ms) and sets the target fill level to 7 ms. Further suppose that the TDM pseudowire connected to receiver 210 is emulating a T1 connection, such that each packet contains 16 T1 frames or 2 ms of buffer time. When receiver 210 begins receiving packets over a TDM pseudowire, processor 240 will initiate temporary storage of packets in playout buffer 220. Thus, after receiving three packets over the TDM pseudowire, the current fill level of playout buffer will be 6 ms.

Processor 240 may then detect that the difference between the target fill level (7 ms) and the current fill level (6 ms) is 1 ms, which is less than the buffer time required for a single packet (2 ms). Thus, in various exemplary embodiments, rather than waiting for an additional packet equal to 2 ms of buffer time, processor 240 adds one or more dummy packets equal to 1 ms to playout buffer 220, such that the current fill level exactly equals the target fill level. Output of packets from playout buffer 220 to circuit emulation engine 230 may then proceed.

It should be apparent that the foregoing description of node 200 is intended to describe the functionality and interaction of the components of node 200. Thus, the functionality of one or more components of node 200 may be separated into additional components. Alternatively, the functionality of one or more components of node 200 may be combined into a single component. Suitable variations of the structure and components of node 200 will be apparent to those of ordinary skill in the art.

Figure 3:
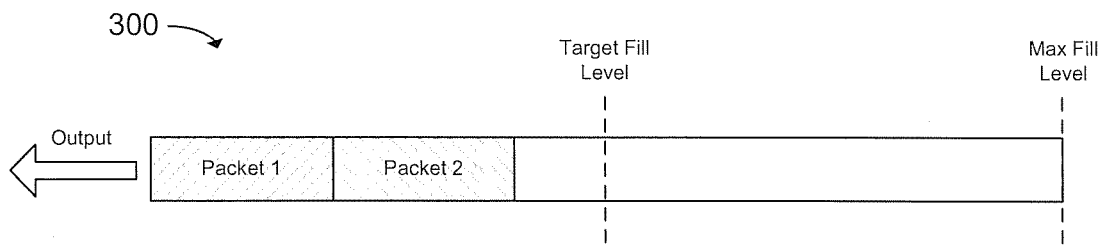
FIG. 3 is a schematic diagram of an exemplary playout buffer filled below a target fill level.

FIG. 3 is a schematic diagram of an exemplary playout buffer 300 filled below a target fill level. More specifically, as illustrated in FIG. 3, playout buffer 300 includes two packets, Packet 1 and Packet 2, each received at a node over a TDM pseudowire. Because the combined size of the packets does not equal or exceed the target fill level of buffer 300, the packets will not be outputted from buffer 300.

Figure 4:
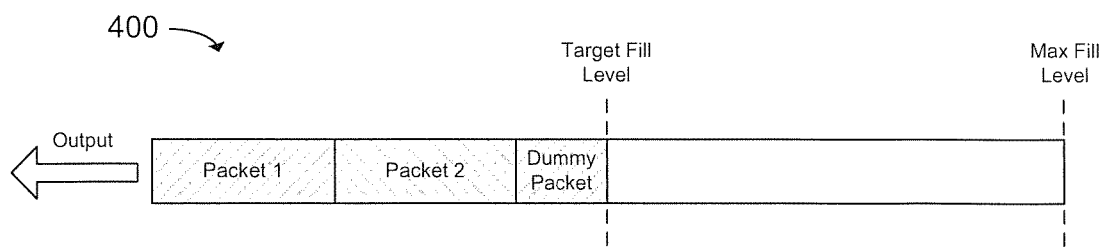
FIG. 4 is a schematic diagram of an exemplary playout buffer in which a dummy packet is added to the end of the buffer to allow the buffer to reach the target fill level.

FIG. 4 is a schematic diagram of an exemplary playout buffer 400 in which a dummy packet is added to the tail or end of the buffer to allow the buffer to reach the target fill level. As illustrated in FIG. 4, a dummy packet is added to the end of playout buffer 400, such that the current fill level of buffer 400 reaches the target fill level. As described in further detail above with reference to FIG. 2, after the dummy packet is added to the buffer 400, buffer 400 may initiate output of packets to a circuit emulation engine, beginning with Packet 1.

Figure 5:
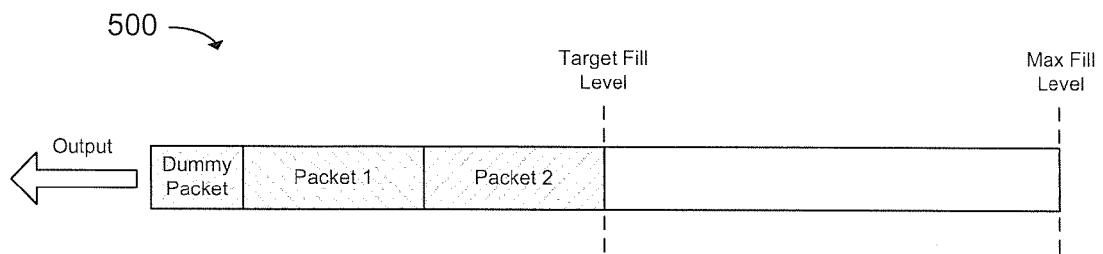
FIG. 5 is a schematic diagram of an exemplary playout buffer in which a dummy packet is added to the front of the buffer to allow the buffer to reach the target fill level.

FIG. 5 is a schematic diagram of an exemplary playout buffer 500 in which a dummy packet is added to the front of the buffer to allow the buffer to reach the target fill level. As illustrated in FIG. 5, a dummy packet is added to the head or beginning of the playout buffer, such that the current fill level of buffer 500 reaches the target fill level. As described in further detail above with reference to FIG. 2, after the dummy packet is added to the buffer 500, buffer 500 may initiate output of packets to a circuit emulation engine, beginning with the dummy packet.

It should be apparent that, in this embodiment, the insertion of the dummy packet will not affect the experience of the user at the TDM destination node. More particularly, because the dummy packet is output from buffer 500 first, the bits inserted into the dummy packet are received at the destination node before any data associated with the TDM stream. Therefore, the user at the destination node will not detect a "blip" or require retransmission of any data associated with the connection.

Figure 6:
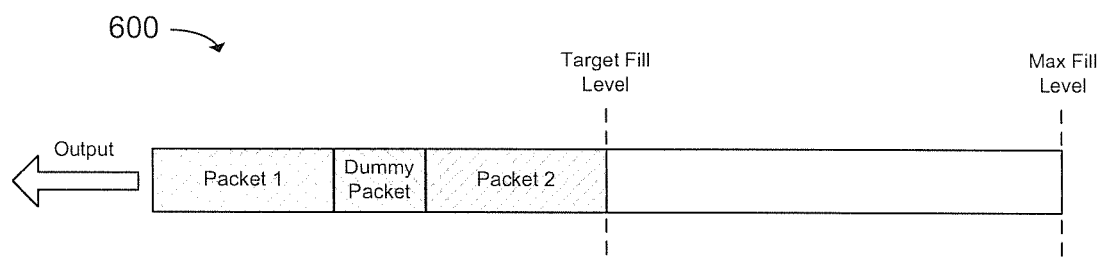
FIG. 6 is a schematic diagram of an exemplary playout buffer in which a dummy packet is added between packets in the buffer to allow the buffer to reach the target fill level.

FIG. 6 is a schematic diagram of an exemplary playout buffer 600 in which a dummy packet is added between packets in the buffer to allow the buffer to reach the target fill level. As illustrated in FIG. 6, a dummy packet is added between Packet 1 and Packet 2 of playout buffer 600, such that the current fill level of buffer 600 reaches the target fill level. As described in further detail above with reference to FIG. 2, after the dummy packet is added to the buffer 600, buffer 600 may initiate output of packets to a circuit emulation engine, beginning with Packet 1.

Figure 7:
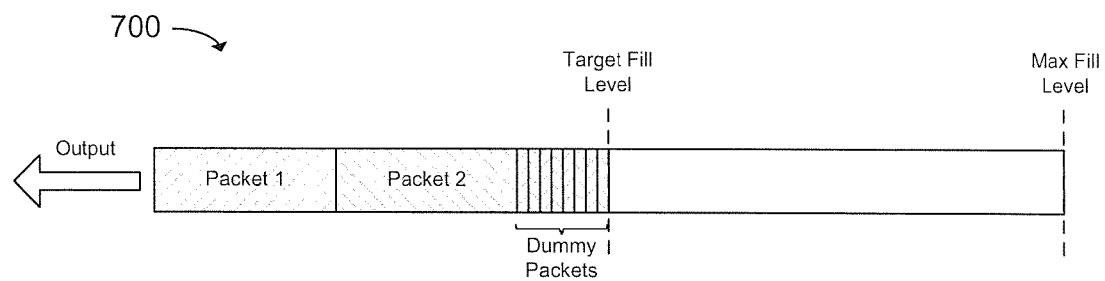
FIG. 7 is a schematic diagram of an exemplary playout buffer in which a plurality of dummy packets are added to the buffer to allow the buffer to reach the target fill level.

FIG. 7 is a schematic diagram of an exemplary playout buffer 700 in which a plurality of dummy packets are added to the buffer to allow the buffer to reach the target fill level. As illustrated in FIG. 7, a plurality of dummy packets are added to the tail of buffer 700, such that the current fill level of buffer 700 reaches the target fill level. In various exemplary embodiments, each of these packets is equal in size to the length of a single TDM frame, which will vary depending on the type of connection emulated by the TDM pseudowire. However, any suitable combination of packets, of either the same size or different sizes, may be used, provided that the combined size of the packets is equal to the target fill level minus the current fill level. As described in further detail above with reference to FIG. 2, after the dummy packets are added to the buffer 700, buffer 700 may initiate output of packets to a circuit emulation engine, beginning with Packet 1.

It should be apparent from the foregoing description of FIGS. 4-7 that any combination of these methods could be used in adding the dummy packets. Thus, for example, a plurality of packets could be added to the head of the buffer or could be scattered throughout the buffer between data packets. Suitable variations of the foregoing examples will be apparent to those of ordinary skill in the art.

Figure 8:
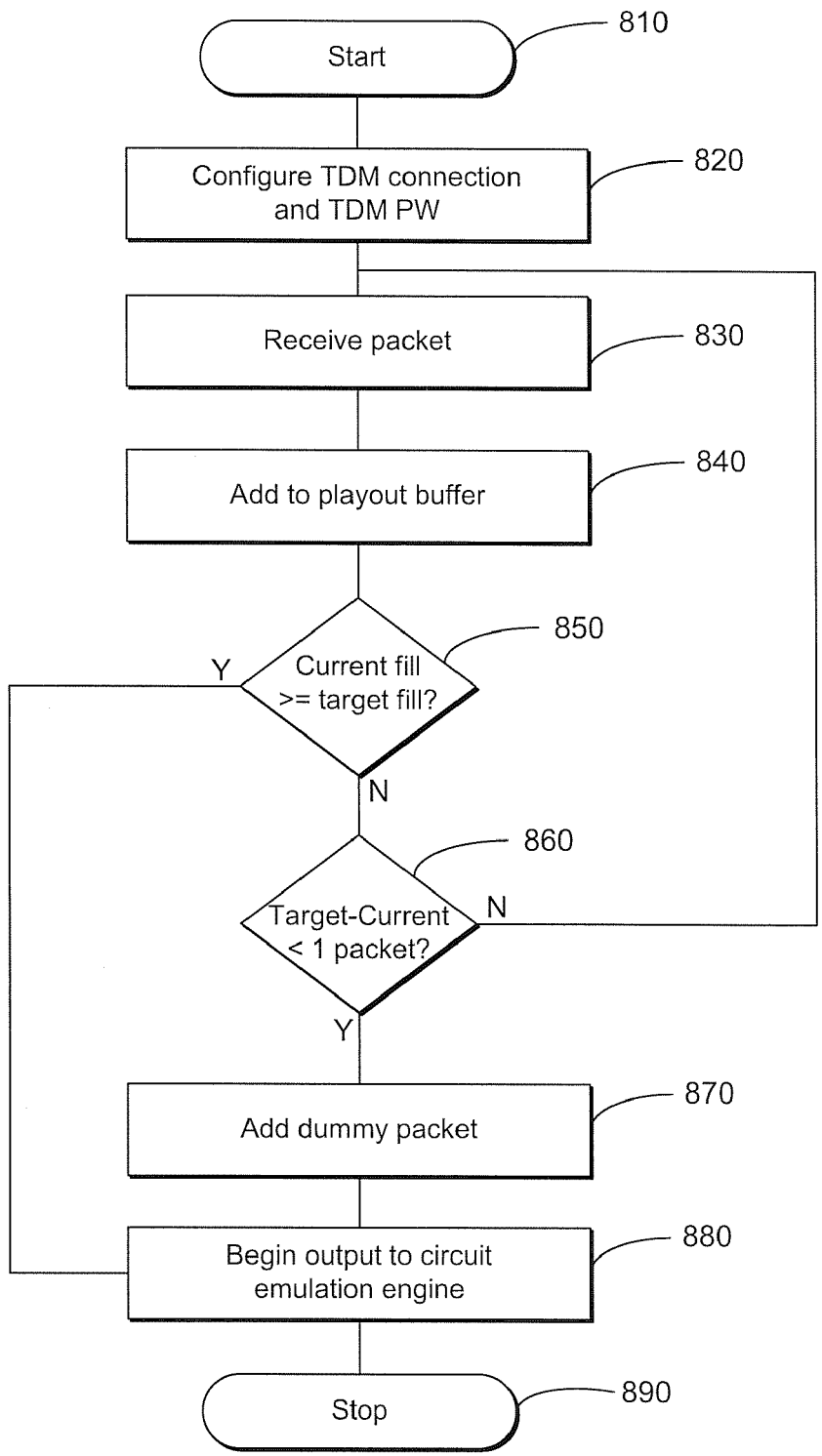
FIG. 8 is a flowchart of an exemplary method for adding a dummy packet to a playout buffer in a node in a packet-switched network.

FIG. 8 is a flowchart of an exemplary method 800 for adding a dummy packet to a playout buffer 155 in a node 150 in a packet-switched network 130. Exemplary method 800 starts in step 810 and proceeds to step 820, where a TDM connection between a TDM sender 110 and a TDM receiver 160 is configured. Furthermore, in step 820, because a portion of the path between TDM sender 110 and TDM receiver 160 traverses packet-switched network 130, a TDM pseudowire 140 is configured between provider edge node 120 and provider edge node 150. After establishing the necessary connections, exemplary method 800 proceeds to step 830.

In step 830, PE node 150 receives a packet associated with the TDM connection sent by PE node 120 over TDM pseudowire 140. Exemplary method 800 then proceeds to step 840, where PE node 150 adds the packet to playout buffer 155. In particular, PE node 150 may write the packet to a machine-readable storage medium contained in buffer 155.

Exemplary method 800 then proceeds to decision step 850, where PE node 150 determines whether the current fill level of playout buffer 155 is equal to or has exceeded the target fill level of playout buffer 155. When it is determined in decision step 850 that the current fill level has reached the target fill level, exemplary method proceeds to step 880, described in further detail below. Alternatively, when it is determined that the current fill level of playout buffer 155 has not yet reached the target fill level, exemplary method 800 proceeds to decision step 860.

In decision step 860, PE node 150 determines whether the target fill level of playout buffer 155 minus the current fill level of playout buffer 155 is less than the size of a single packet associated with the TDM pseudowire. When it is determined in decision step 860 that the difference between the target fill level and the current fill level is less than the size of a single packet, exemplary method 800 proceeds to step 870, where PE node 150 adds at least one dummy packet, such that the current fill level of playout buffer 150 reaches the target fill level.

As described in further detail above with reference to FIGS. 2 and 4-7, the combined size of the one or more dummy packets may equal the difference between the target fill level and the current fill level. After adding the one or more dummy packets, exemplary method 800 proceeds to step 880.

Alternatively, when it is determined in decision step 860 that the difference between the target fill level and the current fill level is greater than or equal to the size of a single packet associated with the TDM pseudowire, exemplary method returns to step 830, where PE node 150 receives an additional packet sent over TDM pseudowire 140. In other words, because an entire data packet may be inserted into playout buffer 155 without exceeding the specified target fill level, it is unnecessary to add a dummy packet.

In step 880, playout buffer 155 begins output of the packets stored in its memory to a circuit emulation engine. More specifically, because the current fill level of playout buffer 155 has reached or exceeded the target fill level, playout buffer 155 may begin output of the packets, such that the circuit emulation engine may recreate the original TDM signal sent over TDM pseudowire 140. Exemplary method 800 then proceeds to step 890, where exemplary method 800 stops.

It should be apparent from the foregoing description of method 800 that the illustrated steps relate solely to normalization of playout buffer 155. Thus, it should be apparent that, after normalization of playout buffer 155, playout buffer 155 may continue to receive and output packets.

According to the foregoing, various exemplary embodiments allow a playout buffer to achieve the exact delay specified by a user. Thus, the various exemplary embodiments do not overfill the target fill level, such that echo is reduced for voice connections, while also reducing the chances of a buffer overrun. Furthermore, the various exemplary embodiments do not underfill the target fill level, such that the likelihood of a buffer underrun is also reduced.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a computer. Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for outputting packets from a playout buffer in a node in a packet-switched network, the method comprising:
   configuring a Time-Division Multiplexing (TDM) pseudowire terminating at the node;
   receiving a plurality of fixed-length packets transmitted over the TDM pseudowire;
   determining a length of the fixed-length packets;
   configuring the target fill level of the playout buffer such that the target fill level is other than a multiple of the length of the fixed-length packets;
   adding the plurality of fixed-length packets to the playout buffer such that the playout buffer reaches a current fill level;
   inserting at least one dummy packet into the playout buffer, wherein:
      a total length of the at least one dummy packet is equal to a target fill level of the playout buffer minus the current fill level, and
      the target fill level represents a minimum fill level required before output of packets from the playout buffer;
   determining, in response to insertion of the at least one dummy packet, that the playout buffer has reached the target fill level; and
   outputting the plurality of fixed-length packets and the at least one dummy packet from the playout buffer.

2. The method for outputting packets from a playout buffer according to claim 1, wherein the step of inserting the at least one dummy packet into the playout buffer occurs when the target fill level minus the current fill level is less than the length of a single fixed-length packet transmitted over the TDM pseudowire.

3. The method for outputting packets from a playout buffer according to claim 1, wherein the step of inserting the at least one dummy packet into the playout buffer occurs only when the node first receives packets over the TDM pseudowire after a negotiation phase of the TDM pseudowire.

4. The method for outputting packets from a playout buffer according to claim 3, wherein the at least one dummy packet contains a pattern of bits equal to a pattern of bits sent to a TDM destination node after the negotiation phase of the TDM pseudowire.

5. The method for outputting packets from a playout buffer according to claim 1, wherein the at least one dummy packet is inserted at the end of the playout buffer.

6. The method for outputting packets from a playout buffer according to claim 1, wherein the at least one dummy packet is inserted at the beginning of the playout buffer.

7. The method for outputting packets from a playout buffer according to claim 1, wherein the at least one dummy packet is inserted between two of the plurality of fixed-length packets added to the playout buffer.

8. The method for outputting packets from a playout buffer according to claim 1, wherein the at least one dummy packet is a plurality of dummy packets and a total size of the plurality of dummy packets is equal to the target fill level minus the current fill level.

9. The method for outputting packets from a playout buffer according to claim 8, wherein the length of each of the plurality of dummy packets is equal to a multiple of a single TDM frame.

10. The method for outputting packets from a playout buffer according to claim 1, wherein the at least one dummy packet contains an idle pattern.

11. A node for use in a packet-switched network providing a Time-Division Multiplexing (TDM) pseudowire, the node comprising:
    a receiver that receives a plurality of fixed-length packets transmitted over the TDM pseudowire;
    a playout buffer encoded on a machine-readable storage medium, the playout buffer having a target fill level representing a minimum fill level required before output of packets, wherein the target fill level is other than a multiple of the length of the fixed-length packets;
    a circuit emulation engine that receives packets outputted from the playout buffer and transmits a TDM signal based on the outputted packets; and
    a processor configured to:
       add the plurality of fixed-length packets to the playout buffer such that the playout buffer reaches a current fill level,
       insert at least one dummy packet into the playout buffer, wherein a total length of the at least one dummy packet is equal to the target fill level of the playout buffer minus the current fill level,
       determine, in response to insertion of the at least one dummy packet, that the playout buffer has reached the target fill level, and
       initiate output of the plurality of the fixed-length packets and the at least one dummy packet from the playout buffer to the circuit emulation engine.

12. The node for use in a packet-switched network according to claim 11, wherein the processor inserts the at least one dummy packet into the playout buffer when the target fill level minus the current fill level is less than the length of a single fixed-length packet transmitted over the TDM pseudowire.

13. The node for use in a packet-switched network according to claim 11, wherein the processor inserts the at least one dummy packet into the playout buffer only when the receiver first receives packets over the TDM pseudowire after a negotiation phase of the TDM pseudowire.

14. The node for use in a packet-switched network according to claim 13, wherein the at least one dummy packet contains a pattern of bits equal to a pattern of bits sent to a TDM destination node after the negotiation phase of the TDM pseudowire.

15. The node for use in a packet-switched network according to claim 11, wherein the at least one dummy packet is inserted at the end of the playout buffer.

16. The node for use in a packet-switched network according to claim 11, wherein the at least one dummy packet is inserted at the beginning of the playout buffer.

17. The node for use in a packet-switched network according to claim 11, wherein the at least one dummy packet is inserted between two of the plurality of fixed-length packets added to the playout buffer.

18. The node for use in a packet-switched network according to claim 11, wherein the at least one dummy packet is a plurality of dummy packets and a total size of the plurality of dummy packets is equal to the target fill level minus the current fill level.

19. The node for use in a packet-switched network according to claim 18, wherein the length of each of the plurality of dummy packets is equal to a multiple of a single TDM frame.

20. The node for use in a packet-switched network according to claim 11, wherein the at least one dummy packet contains an idle pattern.

21. A method of establishing a specified playout buffer delay at a node receiving fixed-length packets transmitted over a Time-Division Multiplexing (TDM) pseudowire, the method comprising:
setting a target fill level corresponding to the specified playout buffer delay such that the playout buffer will not output packets before the playout buffer reaches the target fill level;
receiving at least one fixed-length packet over the TDM pseudowire;
adding the at least one fixed-length packet to the playout buffer;
adding at least one dummy packet to the playout buffer wherein the total length of the at least one dummy packet is less than the at least one fixed-length packet and the total length of the at least one fixed-length packet and the at least one dummy packet is equal to the target fill level;
determining that the playout buffer may begin outputting packets;
adding only fixed-length packets to the playout buffer after the playout buffer begins outputting packets.

22. The method of claim 1, wherein the total length of the at least one dummy packet is less than the length of a fixed-length packet.

23. The node for use in a packet-switched network according claim 11, wherein the total length of the at least one dummy packet is less than the length of a fixed-length packet.

24. A method for outputting packets from a playout buffer in a node in a packet-switched network, the method comprising:
configuring a Time-Division Multiplexing (TDM) pseudowire terminating at the node;
receiving a plurality of fixed-length packets transmitted over the TDM pseudowire;
adding the plurality of fixed-length packets to the playout buffer such that the playout buffer reaches a current fill level;
when a target fill level minus the current fill level is less than the length of a single fixed-length packet transmitted over the TDM pseudowire, inserting at least one dummy packet into the playout buffer, wherein:
a total length of the at least one dummy packet is equal to a target fill level of the playout buffer minus the current fill level, and
the target fill level represents a minimum fill level required before output of packets from the playout buffer;
determining, in response to insertion of the at least one dummy packet, that the playout buffer has reached the target fill level; and
outputting the plurality of fixed-length packets and the at least one dummy packet from the playout buffer.

25. A node for use in a packet-switched network providing a Time-Division Multiplexing (TDM) pseudowire, the node comprising:
a receiver that receives a plurality of fixed-length packets transmitted over the TDM pseudowire;
a playout buffer encoded on a machine-readable storage medium, the playout buffer having a target fill level representing a minimum fill level required before output of packets;
a circuit emulation engine that receives packets outputted from the playout buffer and transmits a TDM signal based on the outputted packets; and
a processor configured to:
add the plurality of fixed-length packets to the playout buffer such that the playout buffer reaches a current fill level,
insert at least one dummy packet into the playout buffer when the target fill level minus the current fill level is less than the length of a single fixed-length packet transmitted over the TDM pseudowire, wherein a total length of the at least one dummy packet is equal to the target fill level of the playout buffer minus the current fill level,
determine, in response to insertion of the at least one dummy packet, that the playout buffer has reached the target fill level, and
initiate output of the plurality of the fixed-length packets and the at least one dummy packet from the playout buffer to the circuit emulation engine.

26. A method for outputting packets from a playout buffer in a node in a packet-switched network, the method comprising:
configuring a Time-Division Multiplexing (TDM) pseudowire terminating at the node;
receiving a plurality of fixed-length packets transmitted over the TDM pseudowire;
adding the plurality of fixed-length packets to the playout buffer such that the playout buffer reaches a current fill level;
inserting at least one dummy packet into the playout buffer, wherein:
a total length of the at least one dummy packet is equal to a target fill level of the playout buffer minus the current fill level,
the total length of the at least one dummy packet is less than the length of a fixed-length packet, and
the target fill level represents a minimum fill level required before output of packets from the playout buffer;
determining, in response to insertion of the at least one dummy packet, that the playout buffer has reached the target fill level; and
outputting the plurality of fixed-length packets and the at least one dummy packet from the playout buffer.

27. A node for use in a packet-switched network providing a Time-Division Multiplexing (TDM) pseudowire, the node comprising:
- a receiver that receives a plurality of fixed-length packets transmitted over the TDM pseudowire;
- a playout buffer encoded on a machine-readable storage medium, the playout buffer having a target fill level representing a minimum fill level required before output of packets;
- a circuit emulation engine that receives packets outputted from the playout buffer and transmits a TDM signal based on the outputted packets; and
- a processor configured to:
    - add the plurality of fixed-length packets to the playout buffer such that the playout buffer reaches a current fill level,
    - insert at least one dummy packet into the playout buffer, wherein a total length of the at least one dummy packet is equal to the target fill level of the playout buffer minus the current fill level and the total length of the at least one dummy packet is less than the length of a fixed-length packet,
    - determine, in response to insertion of the at least one dummy packet, that the playout buffer has reached the target fill level, and
    - initiate output of the plurality of the fixed-length packets and the at least one dummy packet from the playout buffer to the circuit emulation engine.

\* \* \* \* \*